US010915878B2

(12) United States Patent
Hay et al.

(10) Patent No.: US 10,915,878 B2
(45) Date of Patent: Feb. 9, 2021

(54) RELEASEE CASH-RELEASE TOOL AND METHODS OF USE

(71) Applicant: Union Supply Group, Inc., Rancho Dominguez, CA (US)

(72) Inventors: Lyndel D. Hay, Huntington Beach, CA (US); Doyle R. Schaefers, Long Beach, CA (US); Owen Thomas, Culver City, CA (US)

(73) Assignee: Union Supply Group, Inc., Rancho Dominguez, CA (US)

( * ) Notice: Subject to any disclaimer, the term of this patent is extended or adjusted under 35 U.S.C. 154(b) by 123 days.

(21) Appl. No.: 16/029,772

(22) Filed: Jul. 9, 2018

(65) Prior Publication Data

US 2019/0139011 A1     May 9, 2019

Related U.S. Application Data

(60) Provisional application No. 62/567,895, filed on Oct. 4, 2017.

(51) Int. Cl.
*G06Q 20/10* (2012.01)
*G06Q 20/04* (2012.01)
(Continued)

(52) U.S. Cl.
CPC ....... *G06Q 20/1085* (2013.01); *G06Q 20/045* (2013.01); *G06Q 20/4014* (2013.01);
(Continued)

(58) Field of Classification Search
CPC ............ G06Q 20/1085; G06Q 20/045; G06Q 20/40145; G06Q 20/10; G06Q 20/22;
(Continued)

(56) References Cited

U.S. PATENT DOCUMENTS

| 2006/0073883 A1* | 4/2006 | Franks, Jr. | .............. G07F 17/42 463/25 |
| 2011/0106681 A1* | 5/2011 | Cockerell | .............. G06Q 10/06 705/35 |

(Continued)

*Primary Examiner* — Namrata Boveja
*Assistant Examiner* — Carol A See
(74) *Attorney, Agent, or Firm* — James A. Sheridan; Sheridan Law, LLC

(57) ABSTRACT

Disclosed is cash-release system and methods of use for releasing a cash balance of an account associated with a releasee from a secure facility. One embodiment includes a ticket/card printer/dispenser and a cash-release station operating at the secure facility and a network operations center operating remotely to the secure facility. The network operations center may include an operations processor that is coupled with the ticket dispenser and the cash-release station via a secure communications network, wherein the operations processor implements a cash-release management module to retrieve identity information for and the account balance of the releasee from an accounts-management and records system associated with the secure facility, to dispense an encoded ticket/card providing or linking to the identity information and the account balance, and to operate a cash-release station to read the encoded ticket, verify the identity information, and dispense the account balance to the releasee. Other embodiments are disclosed.

20 Claims, 8 Drawing Sheets

(51) Int. Cl.
*G06Q 20/40* (2012.01)
*G07F 19/00* (2006.01)
*G06K 19/07* (2006.01)
*G06K 19/06* (2006.01)

(52) U.S. Cl.
CPC ...... *G07F 19/211* (2013.01); *G06K 19/06028* (2013.01); *G06K 19/06037* (2013.01); *G06K 19/0723* (2013.01)

(58) Field of Classification Search
CPC ....... G06Q 50/00; G07F 19/211; G07F 19/20; G06K 19/06028; G06K 19/06037; G06K 19/0723
See application file for complete search history.

(56) References Cited

U.S. PATENT DOCUMENTS

| | | | |
|---|---|---|---|
| 2011/0137795 A1* | 6/2011 | Nambiar | G06Q 20/227 705/43 |
| 2011/0213618 A1* | 9/2011 | Hodge | G07F 19/20 705/1.1 |
| 2012/0059760 A1* | 3/2012 | Rosenfield | G06Q 40/00 705/39 |
| 2014/0337212 A1* | 11/2014 | Crist | G07F 19/207 705/43 |
| 2015/0006351 A1* | 1/2015 | Dickerson-Wright | G06Q 40/04 705/37 |

* cited by examiner

RELEASEE CASH-RELEASE TOOL AND METHODS OF USE

REFERENCE TO PENDING PRIOR PATENT APPLICATION

This application claims the benefit under 35 U.S.C. 119(e) of U.S. Provisional Patent Application No. 62/567,895, filed Oct. 4, 2017 by Lyndel D. Hay, Doyle R. Schaefers, and Owen Thomas for "DETAINEE CASH-RELEASE TOOL AND METHODS OF USE," which patent application is hereby incorporated herein by reference.

BACKGROUND

In the United States, inmates detained within a correctional custodial facility such as a jail, prison, detention center, mental health institution or other secure facility accumulate funds in a detainee account associated with the detainee. Funds in the detainee account may accumulate in a variety of ways. For example, funds may be transferred into the account by the detainee, transferred from the detainee's family and/or friends, and/or earned while the detainee is in custody through a variety of inmate work programs.

When a detainee is discharged from the facility, a variety of state and federal rules and regulations require the balance of funds in the detainee's account to be released to the inmate. To this end, correctional facilities typically employ some type of accounting system or accounts-management and records system (e.g., a spreadsheet, QuickBooks, or a fully GAAP-compliant general ledger database) to track the amount the discharging detainee, or the releasee, is owed. In addition, each facility implements its own release process to be followed upon a detainee's discharge. Existing release processes typically require a facility administrator/staff member to access one or more third-party software or hardware plug-ins or add-ons to provide the detainee with a check or a prepaid debit or credit card in the amount owed (e.g., to access prepaid debit card writers, check printers, etc.) or access a cash drawer maintained by the facility to manually count out and disburse the cash funds upon release.

Each of these existing options presents a number of tracking and transparency issues. For instance, checks are both difficult and expensive for the releasee to cash in the common instance that the releasee does not have a bank account. Additionally, facility check writers do not provide the issuing facility with a record of when the check was cashed or a verified identity of the person who cashed the check, which can lead to complaints, allegations of check theft, allegations of fraud, and more. Further, checks may be easily signed over to a third party for cashing, or they may be cashed at a check-cashing location that does not adequately verify the identity of the individual cashing the check, which prevents the issuing secure facility from proving that the releasee actually received the funds if subject to a later challenge.

Prepaid debit cards require bank agreements and may not be usable at the point or location of release. In addition, prepaid cards may carry user fees, and purchases made using the cards may be subject to additional fees applied by retail stores, ATM owners, and/or banks without the issuing facility's knowledge, which may violate the associated custody agency's legal obligation to release the funds to the releasee in full. Prepaid cards also often fail to provide a record of when the cards are used, an identity of the user, and what (if any) fees are charged to withdraw the funds, etc.

Issuing a cash refund onsite at the secure facility provides the benefit of releasing the total balance of funds in the releasee's account at the time of release, but cash counted out by facility administrators/staff members presents accuracy issues, as there is no fail-safe method for double-checking the staff member's disbursement. Nor does manually counting cash provide an electronic record of the transaction or provide electronic and automatic tracking of the funds disbursed and the remaining cash-on-hand at the facility. Thus, counting cash from a facility-maintained cash drawer is prone to error, theft, corruption, and presents recordation and tracking issues for facility administration and staff.

SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

One embodiment provides a system for managing a cash-release transaction for a releasee from a secure facility. The system may include (1) a ticket dispenser operating at the secure facility, the ticket dispenser in communication with a secure communications network; (2) a cash-release station operating at the secure facility, the cash-release station in communication with the secure communications network; and (3) a network operations center operating remotely to the secure facility, the network operations center comprising an operations server having an operations processor communicatively coupled with a network interface and a memory storing a cash-release management application, the operations processor configured to implement the cash-release management application for: (a) retrieving, from an accounts-management and records system associated with the secure facility, stored identity information and a balance of an account associated with the releasee; (b) dispensing an encoded ticket from the ticket dispenser, the encoded ticket having a code associated with the stored identity information and the balance of the account; and (c) operating the cash-release station for: (i) reading the code on the encoded ticket; (ii) verifying that an identity input from the releasee matches the stored identity information associated with the releasee; and (iii) dispensing a cash amount equal to the balance of the account to the releasee.

Another embodiment provides a cash-release system for managing a cash-release transaction at a secure facility. The cash-release system may include a network operations center in communication with a ticket printer and a cash-release station, each operating within the secure facility, where the network operations center comprises an operations processor executing a cash-release management module for: (1) receiving, from an accounts-management and records system associated with the secure facility, stored identity information and an account balance for a releasee from the secure facility; (2) generating, via the ticket printer, an encoded ticket having a code associated with the stored identity information and the account balance of the releasee; (3) receiving, via an identity reader of the cash-release station, an identity input from the releasee; (4) reading, via a ticket reader of the cash-release station, the code of the encoded ticket; (5) verifying an identity of the releasee; and (6) dispensing, via a cash dispenser of the cash-release station, the account balance to the releasee.

Yet another embodiment provides a method of managing a cash-release transaction for a releasee from a secure facility using a cash-release system including a remote network operations center having one or more operating processors in communication with a secure facility, a financial institution, and a cash delivery service, the one or more of the operating processors executing a cash-release management module. The method may include the steps of (1) dispensing, via a ticket dispenser operating at the secure facility, an encoded ticket having a code associated with stored identity information for and an account balance of a releasee from the secure facility; (2) receiving, via an identity reader of a cash-release station operating at the secure facility, an identity input from the releasee; (3) reading, via a ticket reader of the cash-release station operating at the secure facility, the code on the encoded ticket; (4) obtaining, from the code on the encoded ticket or from an accounts management and records system associated with the secure facility, the stored identity information; (5) comparing the stored identity information to the identity input to verify an identity of the releasee; (6) obtaining, from the code on the encoded ticket or from an accounts management and records system associated with the secure facility, the account balance; (7) dispensing, from a cash dispenser of the cash-release station, the account balance to the releasee; and (8) providing, to the accounts-management and records system, an invoice reflecting at least the identity of the releasee and the account balance dispensed to the releasee.

Other embodiments are also disclosed.

Additional objects, advantages and novel features of the technology will be set forth in part in the description which follows, and in part will become more apparent to those skilled in the art upon examination of the following, or may be learned from practice of the technology.

BRIEF DESCRIPTION OF THE DRAWINGS

Non-limiting and non-exhaustive embodiments of the present invention, including the preferred embodiment, are described with reference to the following figures, wherein like reference numerals refer to like parts throughout the various views unless otherwise specified. Illustrative embodiments of the invention are illustrated in the drawings, in which.

DETAILED DESCRIPTION

Figure 1:
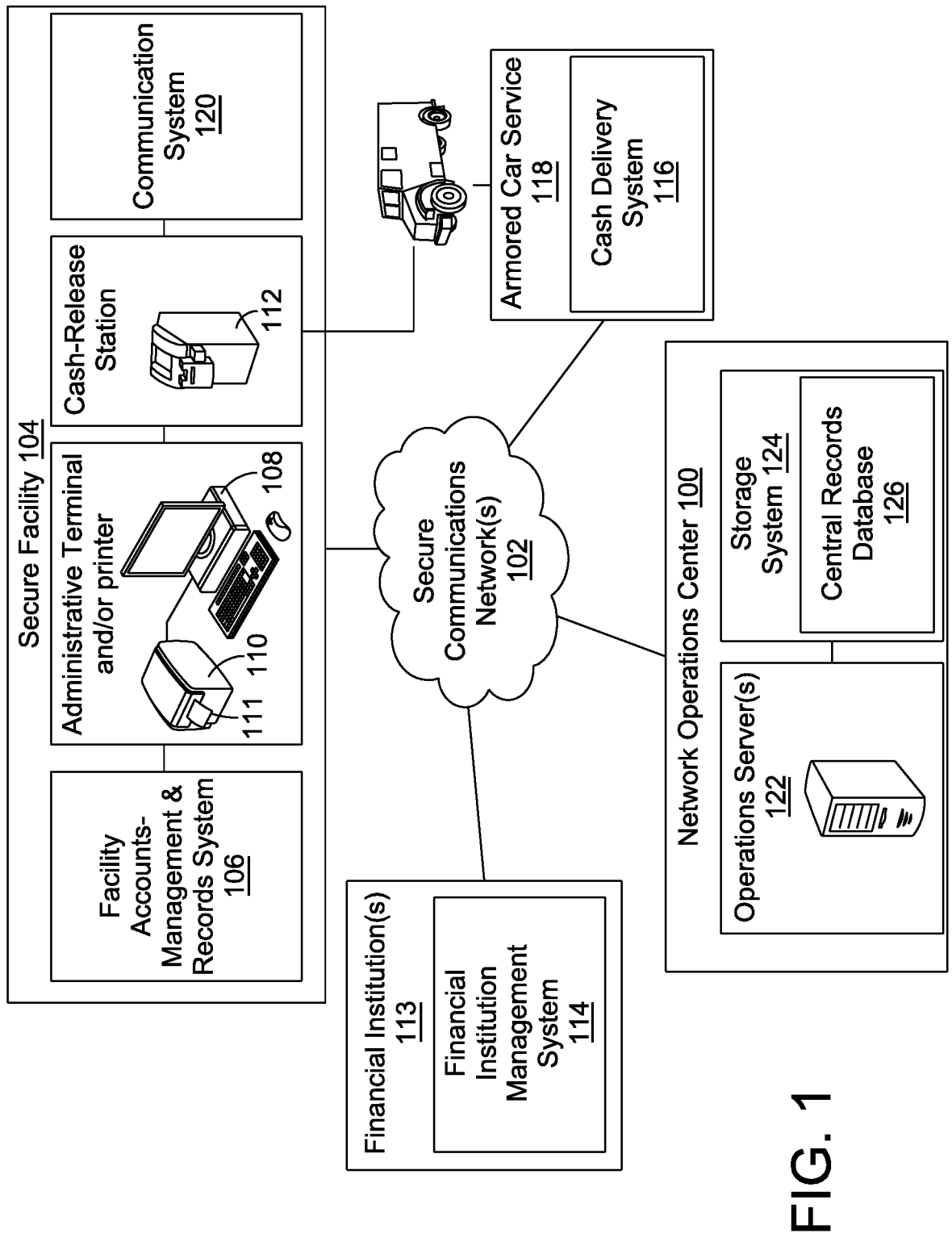
FIG. 1 provides a functional diagram of one embodiment of a cash-release system configured to manage the disbursement of a releasee's accumulated account funds upon the discharge of the releasee from a secure facility.

Embodiments are described more fully below in sufficient detail to enable those skilled in the art to practice the system and method. However, embodiments may be implemented in many different forms and should not be construed as being limited to the embodiments set forth herein. The following detailed description is, therefore, not to be taken in a limiting sense.

Overview

The technology discussed herein relates to a cash-release system and methods of use for managing the disbursement of accumulated funds in a detainee's account upon discharge of the detainee (hereinafter, the "releasee") from a secure facility such as a jail, prison, detention center, mental health institution, or the like. The cash-release system and associated use methods remove human-counting and related errors from the cash-release process. The system and methods also prevent the unsanctioned and/or untraceable transfer of the disbursed funds (e.g., transfer of a check) between the releasee and others and eliminate third-party fees that are typically associated with other non-cash forms of payment (e.g., check cashing fees, prepaid card fees, retailer fees, ATM fees, bank fees), which may violate the legal obligation of the releasing secure facility and/or the associated custody agency to release the accumulated funds in full to the releasee.

In this regard, the disclosed system and methods access the releasee's account information, determine the amount of cash to be released to the releasee, verify the identity of the recipient releasee, and release or dispense the exact amount of cash to the releasee to the penny. The cash-release transaction is automatically and electronically recorded to lend complete visibility, transparency, and accountability to each step of the cash-release process.

Generally, when elements discussed herein are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products or modules. Accordingly, some or all of the subject matter may be embodied in hardware and/or in software or in a combination thereof (including firmware, resident software, microcode, state machines, gate arrays, etc.). As used herein, a software component may include any type of computer instruction or computer executable code located within or on a non-transitory computer-readable storage medium/memory. A software component may, for instance, comprise one or more physical or logical blocks of computer instructions, which may be organized as a routine, program, object, component, data structure, etc., that performs one or more tasks or implements particular data types.

Furthermore, the subject matter may take the form of a computer program product or module on a computer-usable or computer-readable storage medium/memory having computer-usable or computer-readable program code embodied in the medium for use by or in connection with an instruction execution system. In the context of this document, a computer-usable or computer-readable storage medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium. By way of example, computer readable media may comprise computer storage media and communication media.

Computer storage media/memory includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by an instruction execution system.

Communication media typically embodies computer readable instructions, data structures, program modules, or other data in a modulated data signal such as a carrier wave or other transport mechanism and includes any information delivery media/network channel. The term "modulated data signal" means a signal that has one or more of its characteristics set or changed in such a manner as to encode information in the signal. By way of example, and not limitation, the term communication media, channel, or network includes wired media such as a wired network or direct-wired connection, and wireless media such as satellite, wireless networking technologies (e.g., WAN, Wi-Fi, WLAN, WiMAX), acoustic, RF, infrared, Bluetooth, and/or other wireless media. Combinations of the any of the above should also be included within the scope of communication media and/or channels.

When the subject matter is embodied in the general context of computer-executable instructions, the embodiment may comprise program modules or tools, executed by one or more systems, computers, processors, or other devices. Generally, program modules include routines, programs, objects, components, data structures, etc. that perform particular tasks/functions or implement particular data types. Typically, the functionality of the program modules may be combined or distributed as desired in various embodiments. Software implementations may include one or more computer programs comprising executable code/instructions that, when executed by a processor, may cause the processor to perform a method defined at least in part by the executable instructions. The computer program/module can be written in any form of programming language, including complied or interpreted languages, and can be deployed in any form, including as a standalone program or as a module, component, subroutine, or other unit suitable for use in a computing environment.

Exemplary Embodiments

As discussed above, the present systems and methods generally relate to a cash-release system configured to manage the disbursement of a releasee's accumulated account funds upon the discharge of the releasee from a controlled-environment or secure facility (e.g., a jail or prison, a hospital, a school dormitory) operated by an associated custody agency (e.g., a state corrections department). In operation, the cash-release system may pull releasee account information from a facility-based accounts-management and records system into a remote network operation center ("NOC") and, based on the releasee account information, print/disburse an encoded ticket or card onsite at the secure facility. The code on the ticket/card directly provides or alternatively serves as a lookup or query code for accessing or looking up stored identity information for the releasee and the cash balance of the releasee's account to be disbursed to the releasee. The releasee may then present the ticket/card at a cash-release station, which reads the ticket/card, verifies the identity of the releasee, verifies the releasee's account details either encoded on the ticket/card or stored in an associated database, and then counts out and disburses the exact amount of cash funds to the releasee before an invoice reflecting the release transaction and funds disbursed is provided back to the facility accounts-management and records system for record-keeping and tracking purposes. An invoice may then be provided to the accounts-management and records system and/or a database maintained at the NOC, providing transparency and traceability for the cash-release transaction. Such tracking enables the system to communicate with a financial institution and/or a cash-delivery service to track the cash both dispensed by and on hand at the cash-release station and to order cash replenishment when necessary.

Turning to the figures, FIG. 1 provides a functional block diagram of an illustrative environment where various techniques described herein may be implemented according to some embodiments. As shown, a network operations center ("NOC") 100 may be communicatively coupled via a secure communications network or networks 102 to a number of components maintained at or by a secure facility 104 and/or the operating custody agency. The functionality and components of the NOC 100 may be combined in a single computing platform or distributed across a number of computing platforms as desired and/or appropriate in various embodiments. The distribution of processing, storage, software instructions, scripts, algorithms, and user interfaces may be distributed in any appropriate manner across any number of computing platforms that are similarly or disparately geographically situated.

In this embodiment, the NOC 100 may be in communication with an accounts-management and records system 106 maintained by the secure facility 104 and/or the operating custody agency, an administrative terminal 108 and/or a printer/card dispenser or generator 110 operating at the secure facility 104 to print, dispense, or otherwise generate an encoded ticket/card 111, and a cash-release station 112 operating to dispense cash at the secure facility 104. The NOC 100 may also be communicatively coupled with one or more management systems 114 of a supporting financial institution or institution(s) 113 (e.g., bank systems) and a cash delivery system 116 of an armored car service 118 for cash replenishment of the cash-release station 112 operating at the secure facility 104.

The secure facility may implement a communication system 120 that provides communication abilities to the secure facility 104. To that end, the communication system 120 may include one or more analog switches, servers, IP gateways, PBX systems, etc. For example, in some embodiments, the communication system 120 may be operable to provide communications through the network 102, which may include, for example, the Internet. Additionally or alternatively, the network may include wireless cellular networks or the like. The secure network 102 may be any appropriate secure, firewalled wide area network ("WAN")

linking the NOC 100 with the secure facility 104 systems and the financial and armored car systems 114, 116.

Figure 2:
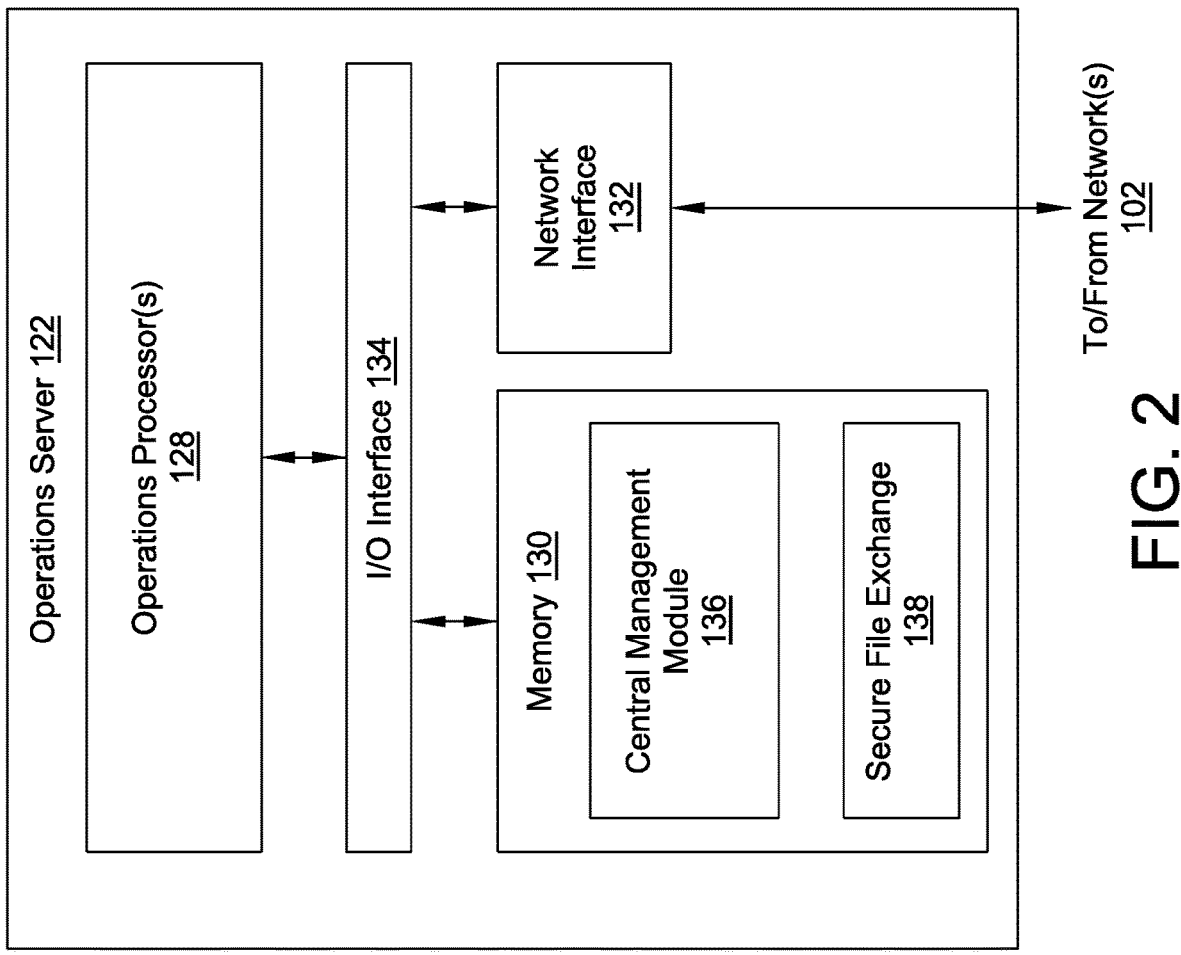
FIG. 2 provides a functional diagram of one embodiment of an operations server of a network operations center of the cash-release system of FIG. 1.

In some embodiments, the NOC 100 may include an operations server 122 in communication with a storage system 124 that houses a central records database 126, which may be configured to store a ledger of transaction information for use in invoicing each secure facility/custody agency for funds disbursed on the facility or agency's behalf. FIG. 2 provides a functional diagram of one exemplary embodiment of the operations server 122. In this embodiment, the operations server 122 may include one or more operations processors 128 that communicate with a memory 130 and a network interface 132 over an appropriate I/O interface 134. The memory 130 may store a number of algorithm modules such as a central management module 136 and a secure file exchange 138. The secure file exchange may comprise an interface application that transfers files using the secure file transfer protocol ("sftp") or any other secure file exchange program and protocol to provide secure file access, transfer, and management.

Figure 3:
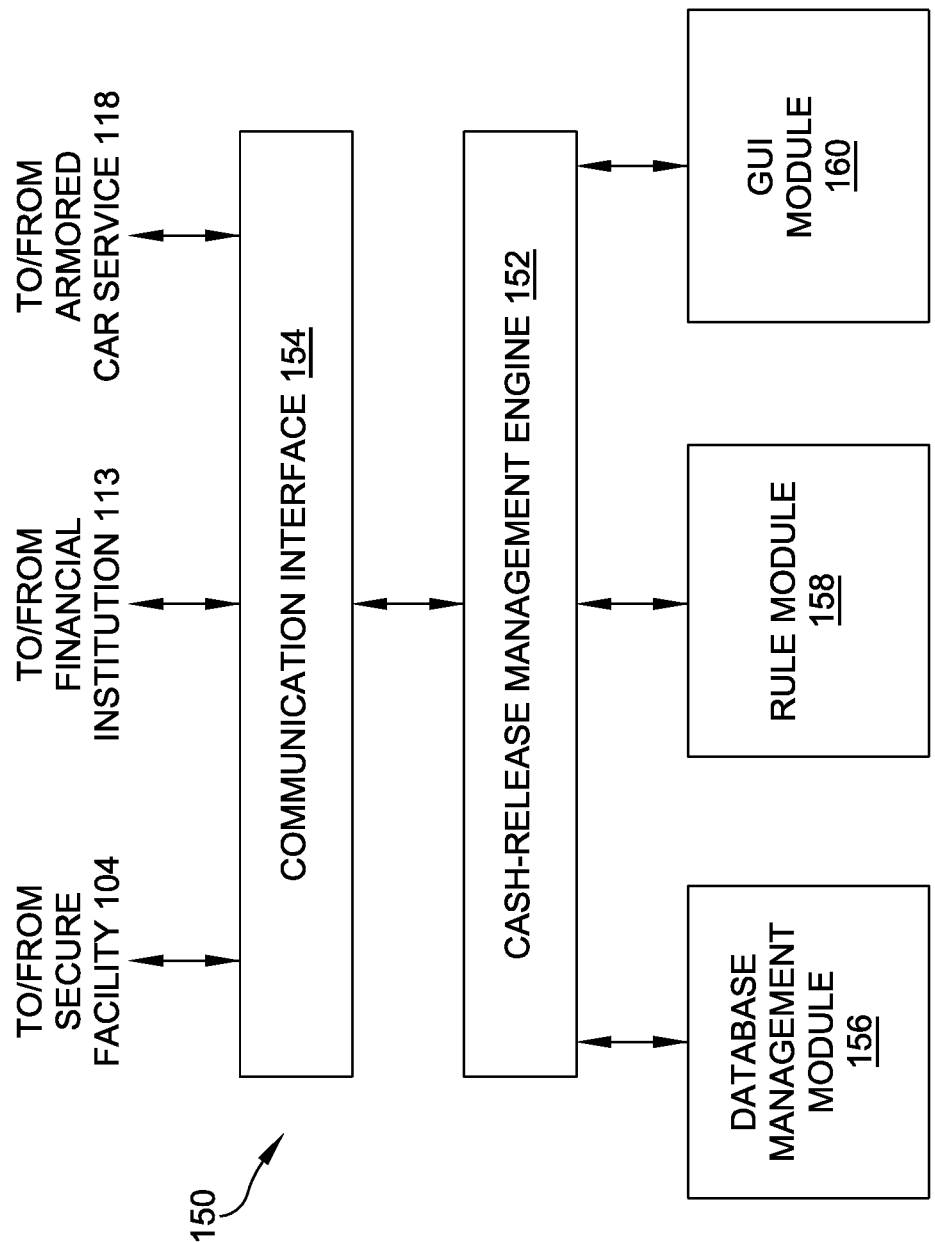
FIG. 3 provides a functional block diagram of an illustrative cash-release management software application module in some embodiments.

FIG. 3 provides a block diagram of an illustrative cash-release management application module 150 according to some embodiments. In various implementations, the cash-release application module 150 may be stored in the central management module 136 and executed by the operations processor(s) 128 of the operations server 122 at the NOC 100. In other embodiments, the application 150 may be stored and/or executed in whole or in part at the facility accounts-management and records system 106, the administrative terminal 108, the printer/card dispenser 110, the facility-based cash-release station 112, and/or any other appropriate system component or combination of components.

The application module 150 may link to the local accounts-management and records system 106 to retrieve identity information and information regarding the releasee's account before and/or during the release transaction to determine a balance in the releasee's account for disbursement, to direct the printing or dispensing of the encoded ticket/card 111 via the administrative terminal 108 and/or the printer/card dispenser 110, to direct both identity and account verification and disbursement of funds at the cash-release station 112, and/or to provide a transaction record and cash-release invoice back to the facility's local accounts-management and records system 106 and/or to the central records database 126 after the cash-release transaction is complete, thereby linking the secure facility's local, institutional management with the remote NOC 100 across the secure file exchange 138 and the secure network 102. The cash-release management application 150 may also link to the supporting bank management system 114 and the cash delivery system 116 of the armored car service 118 to ensure proper replenishment of the cash-release station 112 and to maintain a facility and/or agency-level ledger reflecting the secure facility's cash use.

As shown in FIG. 3 and in one embodiment, the cash-release management application module 150 may include a cash-release engine 152 coupled to a communication interface 154, a database management module 156, a rule module 158, and a graphical user interface (GUI) module 160. The cash-release management engine 152 may be configured to perform a variety of operations including those described below with respect to FIG. 8.

The communication interface 154 may enable the cash-release management application 150 to exchange information with other system components (e.g., facility accounts-management and records system 106, the administrative terminal 108, the printer/card dispenser 110, and/or the cash-release station 112) via the secure file exchange 138 and the secure network 102. In some embodiments, the communication interface 154 may be configured to transmit and/or receive information using secure socket layer (SSL) encryption. Additionally or alternatively, other connections may also be used, such as, for example, XML file transmission utilizing file transfer protocol (FTP), hypertext transfer protocol (HTTP) POST transactions, or other data transmission protocols. The communication interface 154 may further include any of a variety of standardized application programming interfaces (APIs) configured to allow different software programs to communicate (e.g., to request services and respond to such requests) in an autonomous, web-based, and/or platform-independent manner. For example, the facility accounts-management and records system 106 operating at the secure facility 104 may choose to expose certain data (e.g., the releasee identity, releasee account balance) and/or certain operations completed (e.g., cash payments made) via a web services interface. The communication interface 154 may then access the exposed data and/or functions via the appropriate API(s).

The database management module 156 may include any suitable database management system (DBMS) or application configured to manage the creation, maintenance, and use of the central records database 126 of FIG. 1. The rule module 158 may include one or more sets of rules, in any suitable format, that facilitate the provision and management of cash-release transactions from the secure facility 104 to releasees, as described in more detail below.

The GUI module 160 may be configured to provide, for example, a web-based user interface (WUI) that implements JAVA®, AJAX®, ADOBE FLEX®, MICROSOFT .NET®, or similar technologies to provide real-time user control. In other cases, the GUI module 160 may be a command line interface or another suitable interface using non-web-based technologies.

In various embodiments, a GUI may be displayed to a user via the GUI module 160 of FIG. 3. The GUI may be operable to display information and/or receive commands from the user. In various implementations, the GUI may be displayed, via any number of appropriate preconfigured and interactive screens, to a user at the facility accounts-management and records system 106, the administrative terminal 108, the printer/dispenser 110, the cash-release station 120, the financial institution management system 114, and/or the cash delivery system 116. For example, the GUI module 160 may display one or more preconfigured screens at the administrative terminal 108 that shows the releasee's identity information and/or account balance. Alternatively, the GUI module 160 may display one or more preconfigured screens at the administrative terminal 108 that show a cash balance currently stored in the cash-release station and available for disbursement or may show an automated request for cash replenishment that has been submitted to the financial institution management system 114.

A browser or application window at any of the facility accounts-management and records system 106, the administrative terminal 108, the printer 110, the cash-release station 112, and/or the financial institution management system 114 and cash delivery system 116 may be configured to display text content, image content, input features, navigable links, etc. of the preconfigured screens of the GUI. Each preconfigured screen may include any appropriate type of content in various combinations, and the screen(s) displayed to the users may be specific to the viewing platform. For example, screen(s) presented at the administrative terminal 108 may differ from the screen(s) shown at the cash-release station 112, which may differ from the screens shown at the financial institution management system 114, depending on a variety of factors including, for example, the type of information to be collected and/or transmitted, security concerns, user permissions, and so on.

GUI screen content may be interspersed or combined in any suitable fashion according to the capabilities of the browser and language used to implement the GUI, and may be displayed in any suitable area of the browser or application window. In some embodiments, the window may be generated and managed by a web browser such as, for example, MICROSOFT EXPLORER®, FIREFOX®, SAFARI®, CHROME®, etc., implemented from the appropriate system component.

In various embodiments, the modules shown in FIGS. 2-3 may represent sets of software routines, logic functions, and/or data structures that are configured to perform specified operations. Although these modules are shown as distinct logical blocks, in other embodiments, at least some of the functionality provided by these modules may be combined into fewer blocks or parceled into additional blocks. Conversely, any given one of the modules may be implemented such that its functionality is divided among two or more logical blocks. Moreover, although shown with a particular configuration, in other embodiments these various modules may be rearranged in other suitable ways.

Figure 4:
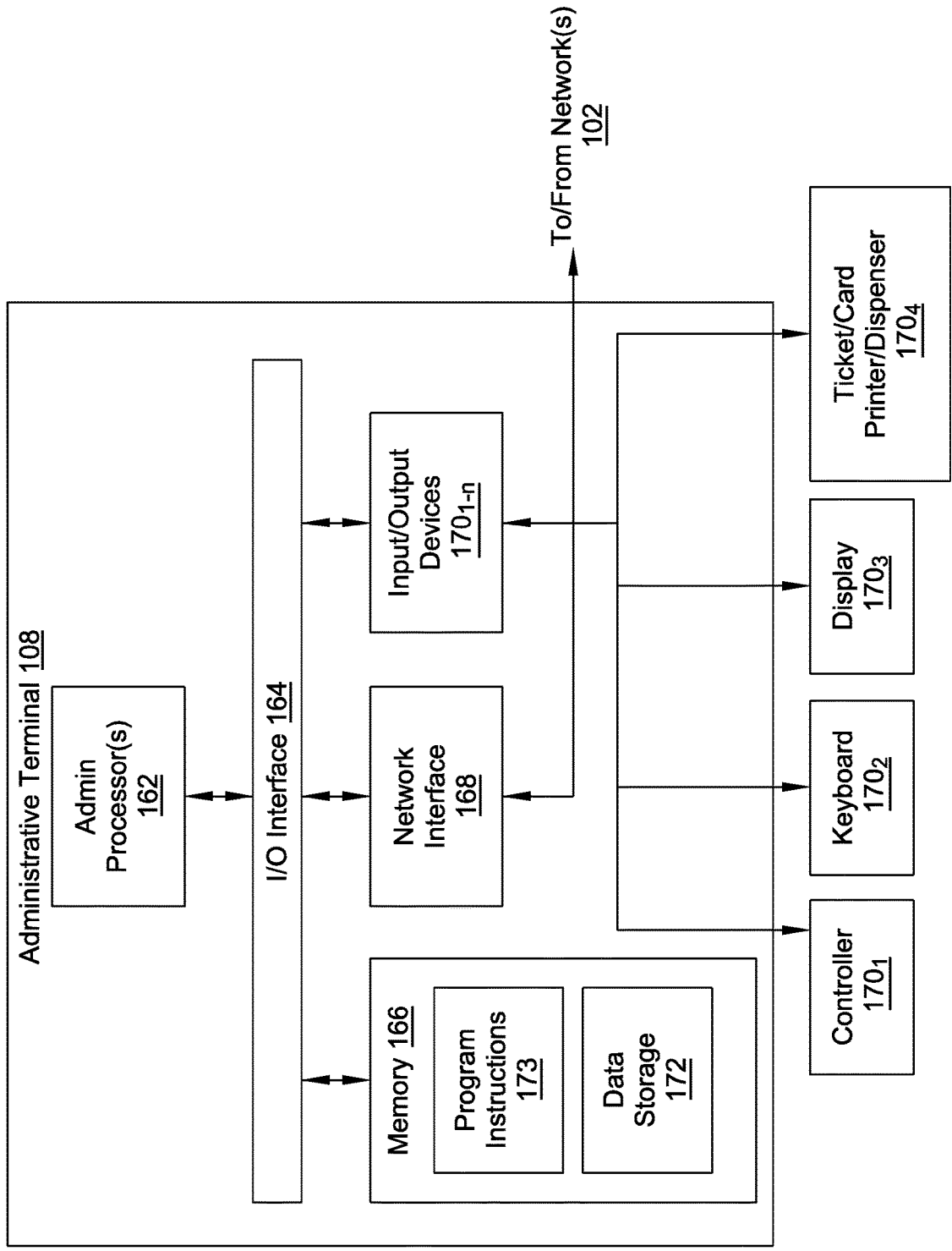
FIG. 4 provides a functional block diagram of one embodiment of an optional administrative terminal operating at the secure facility of FIG. 1.

In some operational embodiments, secure-facility staff/administration may employ the administrative terminal 108 to manually operate the cash-release system and cash-release management application to run reports or to simply observe system functions in real time as the cash-release station 112 is operated from the NOC 100 without local intervention at the secure facility 104. In one embodiment shown in FIG. 4, the (optional) administrative terminal 108 may include one or more administrative processors 162 coupled via an appropriate I/O interface 164 with a memory 166, a network interface 168, and a number of input/output devices $170_{1-n}$ such as, for example, a controller (e.g., a mouse, track pad, etc.) $170_1$, a keyboard $170_2$, a display $170_3$ adapted to present the preconfigured and interactive screens of the GUI, and the printer/card dispenser $170_4$. The memory 166 may include data storage 172 housing facility records and, in some embodiments, may store program instructions 173 relating to the hosted cash-release management application module 150 and enabling management of the administrative terminal 108 and any associated printer/dispenser 110 via the application 150 and one or more of the controllers $170_1$.

As discussed above and in one embodiment, a ticket/card 111 may be printed or dispensed automatically upon activation of a release function, or alternatively, the system may hold the ticket/card 111 for printing or production until the facility staff is ready to provide the ticket/card 111 to the releasee. In another embodiment, the printer/card dispenser 110 may be a standalone component that incorporates processing and networking capabilities for ticket printing or card writing without the use of a separate administrative terminal 108.

Figure 5:
FIG. 5 provides a top view of one embodiment of an encoded ticket/card produced by the cash-release system of FIG. 1.

An exemplary ticket/card 111 is shown in FIG. 5. The ticket or card 111 printed or dispensed from the administrative terminal 108 and/or the printer/card dispenser 110 may include any appropriate code 174 such as, for example, an RFID tag, a bar code, a QR code, or a magnetic strip. The code 174 may incorporate the releasee's stored identity information, the releasee's account balance, and any other relevant release information, such that the release information may be extracted directly from the code 174. Alternatively, the code 174 may serve as a query code for linking to, accessing, or looking up the identity information, account information, and/or additional release information from another database such as the central records database 126 stored in, for example, the NOC 100, the data storage 172 of the administrative terminal 108 operating at the secure facility 104, or the facility accounts-management and records system 106 operating at the secure facility 104. Notably, the stored identity information provided by or queried using the ticket/card code 174 may include a thumbprint, a mug-shot, a wrist-band code, an inmate/detainee ID, an iris scan, a voice print, or any other identifier on file for the releasee in the secure facility's local accounts-management and records system 106.

Figure 6:
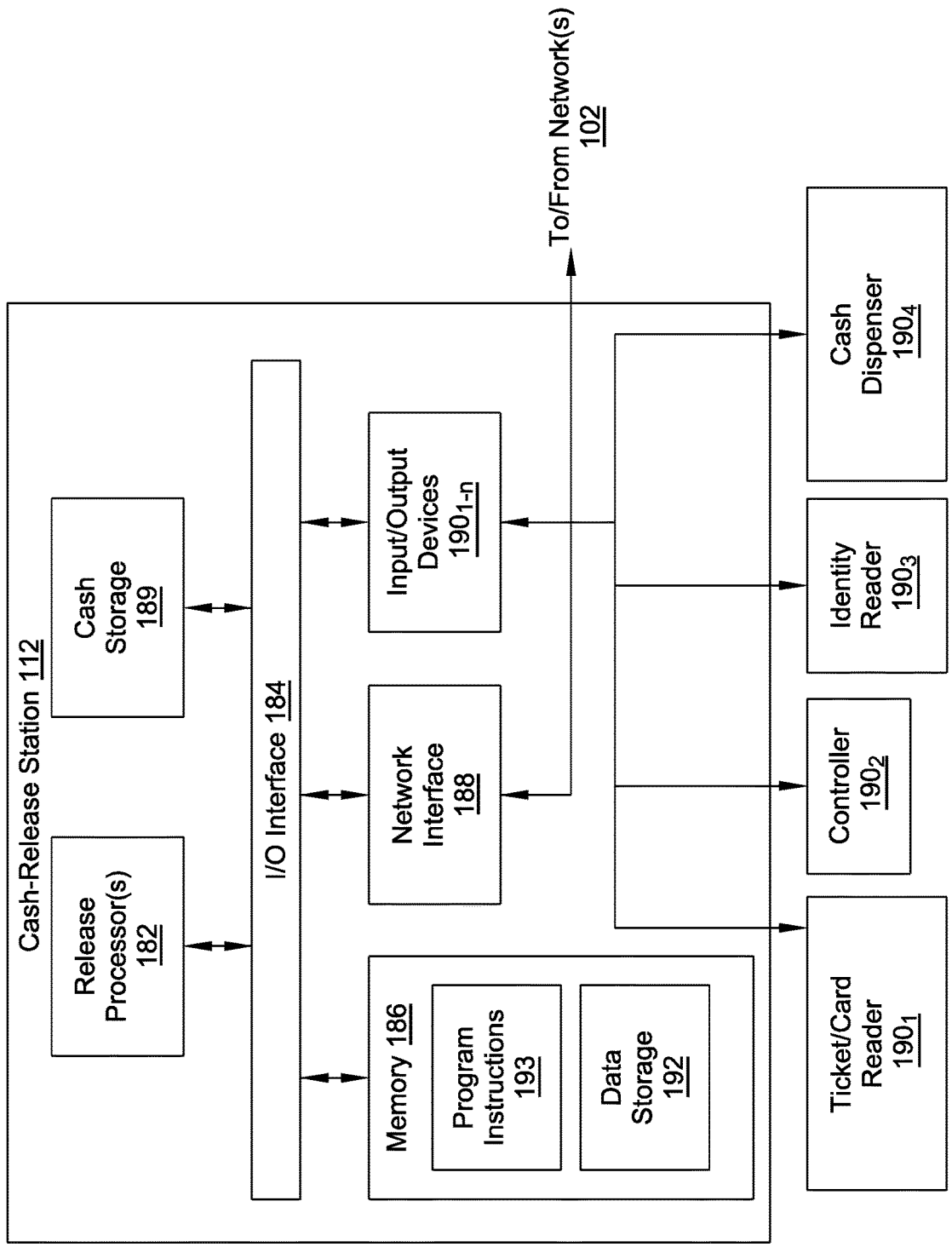
FIG. 6 provides a functional block diagram of one embodiment of a cash-release station of the cash-release system of FIG. 1.

The cash-release station 112 operating at the secure facility 104 may include components similar to the administrative terminal 108 and/or the standalone printer/card dispenser 110. In one embodiment shown in FIG. 6, the cash-release station 112 may include one or more release processors 182 that communicate via an appropriate I/O interface 184 with a memory 186 storing appropriate program instructions 193 and a data storage 192, a network interface 188, a cash storage 189, and a number of input/output devices $190_{1-n}$ such as a ticket/card reader $190_1$, a controller $190_2$ such as a keyboard and/or touchscreen, an identity verification reader $190_3$ such as a scanner (e.g., retina, thumbprint), a camera, and/or a sound or voice recorder, and a cash dispenser $190_4$.

Figure 7:
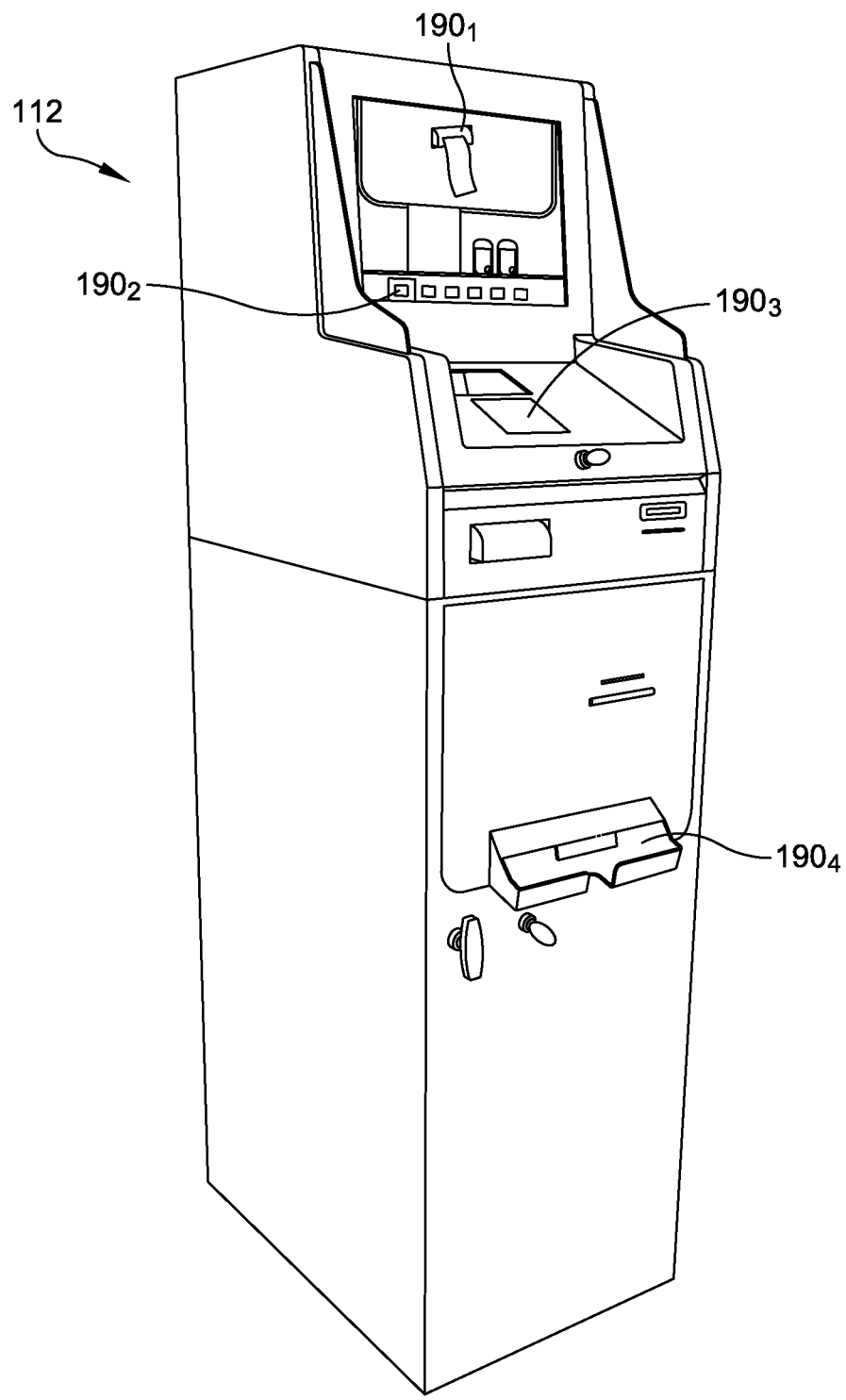
FIG. 7 illustrates a perspective view of one exemplary embodiment of the cash-release station of FIG. 6.

In one embodiment, the cash-release station 112 may take the form of a casino-type cash dispenser, an example of which is shown in FIG. 7. The cash-release station 112 may be equipped with optical scanners for cash bills, flexible coin-hoppers, and a high-quality and flexible software development kit. Other embodiments may employ cash-release stations of any appropriate size, configuration, and/or model with a sufficiently supported application programming interface.

Figure 8:
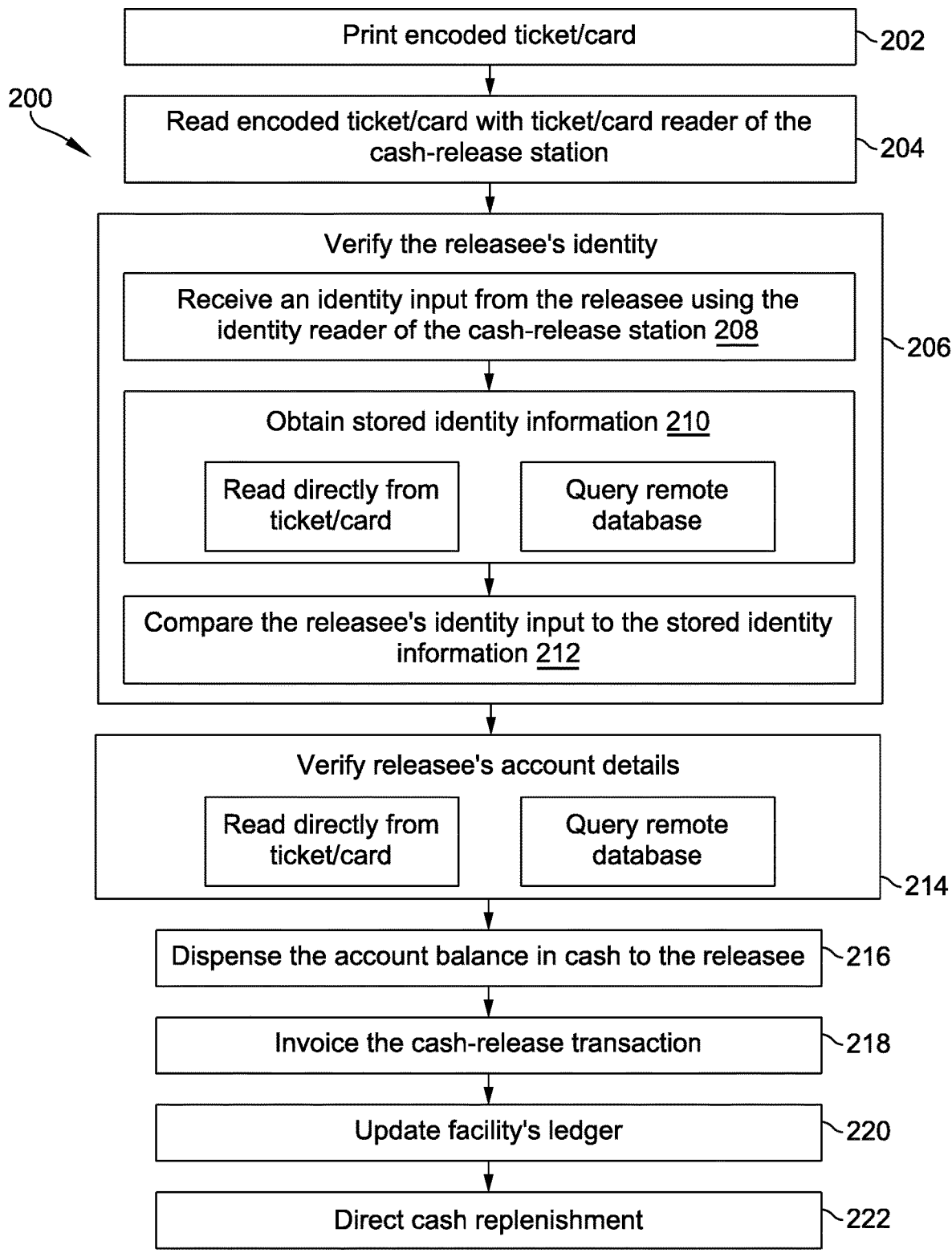
FIG. 8 provides a flowchart depicting one embodiment of an exemplary method of managing a cash-release transaction using the system of FIG. 1.

The various systems shown in FIGS. 1-7 may allow the execution of methods relating to the accurate and trackable cash release of an account balance to a releasee of a secure facility. FIG. 8 provides a flowchart depicting one embodiment of a cash-release transaction method (200). In this embodiment, the method (200) begins when a releasee receives a printed ticket or card 111 from the printer/card dispenser 110 (202). The releasee may then approach the cash-release station 112, where the ticket/card reader $190_1$ of the cash-release station 112 reads the ticket/card 111 (204) and verifies the identity of the holder or releasee (206). To verify the releasee's identity (206), the cash-release station 112 may employ the identity reader $190_3$ to receive an identity input directly from the releasee (208) comprising, for example, a thumbprint, a mug-shot, a wrist-band code, an inmate/detainee ID, an iris scan, a voice print, or any other identifier on file for the releasee in, for example, the secure facility's accounts-management and records system 106. The cash-release station 112 may then obtain stored identity information associated with the releasee (210). The releasee's identity input may then be compared to stored identity information on file to verify that the ticket/card holder is indeed the releasee (212).

Once the releasee's identity is verified (206), the releasee's account details may be accessed and verified (214) in preparation for release of the releasee's account balance. In one embodiment, the releasee's identity and/or account details may be verified via information encoded directly within the code 174 of the encoded ticket/card 111. Alternatively, the releasee may approach the cash-release station 112, where the cash-release station reads the ticket/card 111 and queries a remote database (e.g., the accounts-management and records system 106, the central records database 126 at the NOC 100) to obtain the identity information, account balance, and/or any other relevant release information associated with the releasee. The cash-release station 112 may then use the retrieved information, in combination with the identity input from the releasee, to verify the releasee's identity (206) before verifying the releasee's account details (214).

After the releasee's identity is verified (206) and the releasee's account details (e.g., account balance) are accessed and verified (214), either using information encoded on the ticket/card 111 or via querying remote systems and/or databases, the cash-release station 112 may employ the cash dispenser $190_4$ to count out the release's account balance in cash to the releasee to the penny (216) with no subsequent fees and with complete visibility into all of the steps of the cash-release transaction.

An invoice reflecting the cash-release transaction may be provided to the facility's account management and records system 106 (218), the central records database 126, and/or any other appropriate records system or database. The invoice may communicate any appropriate information relevant to the cash-release transaction including, for example, the time, location, releasee identity confirmation, amount of funds released, and any fees charged at the time of the transaction. An ongoing facility or agency ledger may be stored in facility accounts-management and records system 106, the central records database 126, or any other appropriate database or data storage (220), and used in managing cash replenishment of the cash-release station 112 via queries to or communication with the financial institution 113 and its financial institution management system 114 and/or the armored car service 118 and its cash delivery system 116 (222), as well as tracking amounts disbursed on the secure facility's behalf.

Using the central management module 136 and the cash-release management software application module 150, the printer/card dispenser 111 and/or the cash-release station 112 may be operated by facility staff/administration at the secure facility 104 (e.g., via the administrative terminal 108) or they may be operated remotely from the NOC 100 without intervention by facility staff/administration.

The cash-release system and associated methods discussed herein network the NOC 100 to each facility's local accounts-management/records system and software (e.g., equipment, applications, data formats, invoicing requirements, file types, interface methods, etc.). Embodiments of the cash-release system and methods may employ customized middleware to translate data from the local accounts-management/records system into an appropriate and/or useable data structure (i.e., CSV file to XML file) for the cash-release system. In this regard, the cash-release system may be implemented in connection with any file type and/or interface methods, firewall type, device drivers, printer/card dispenser types, and cash-counting machines, each of which may incorporate or be linked to various biometric identifier mechanisms. Moreover, the embodiments of the cash-release system automate the cash-release transaction process such that no officer, administrator, or other facility staff member must operate any facility hardware/software during the process or touch, contact, or count out cash.

The cash-release system and methods provide a number of advantages over current check, pre-paid card, and/or cash drawer release systems. First, the system prevents third-party fees associated with check cashing and/or use of prepaid cards. Second, the system removes human cash-counting from the cash-release transaction process, and in some embodiments, removes local facility administration from the cash-release process altogether. The systems and methods provide accurate and consistent identity verification to ensure the cash funds are released to the authorized releasee. The systems and methods provide complete transparency and visibility into every step of the cash-release transaction and automate record-keeping, at the individual releasee, facility, and agency level, and provide a verifiable record of fees (if any) charged. The system also links with a financial institution or institutions and a cash-replenishment service to ensure cash replenishment when needed so that cash is consistently on hand at the cash-release station 112. The secure facility/agency is invoiced for cash dispensed from the cash-release station.

While the cash-release system and associated methods have been described with reference to a detainee/releasee from a secure facility, the system and methods may also apply to any institution in which funds are held by the institution on behalf of an individual in a pre-paid account that must be closed and funds returned to the individual if and when the individual is terminated. Examples include sailors aboard a ship at sea who use scrip rather than cash while onboard, corporate employees who use swipe cards or RFID cards to pay for canteen meals, snacks, and personal items, and military service men and women who use swipe or RFID cards to pay for commissary meals, snacks, and/or personal items.

Although the above embodiments have been described in language that is specific to certain structures, elements, compositions, and methodological steps, it is to be understood that the technology defined in the appended claims is not necessarily limited to the specific structures, elements, compositions and/or steps described. Rather, the specific aspects and steps are described as forms of implementing the claimed technology. Since many embodiments of the technology can be practiced without departing from the spirit and scope of the invention, the invention resides in the claims hereinafter appended.

What is claimed is:

1. A system for managing a cash-release transaction for a releasee from a secure facility, the system comprising:
    a ticket dispenser operating at the secure facility and exclusively operated by the secure facility, the ticket dispenser in communication with a secure communications network;
    a cash-release station operating at the secure facility and exclusively operated by the releasee and the secure facility, the cash-release station in communication with the secure communications network and comprising:
        a ticket reader in communication with an identity reader comprising one or more of a fingerprint scanner, a camera, a bar-code reader, an iris scanner, and a voice recorder; and
        a cash storage in communication with a cash dispenser; and
    a network operations center operating remotely to the secure facility, the network operations center comprising an operations server having an operations processor communicatively coupled with a network interface and a memory storing a cash-release management application, the operations processor configured to implement the cash-release management application for:
        retrieving, from an accounts-management and records system associated with the secure facility, stored identity information and a balance of an account associated with the releasee;

upon activation of a release function for the releasee by the secure facility, dispensing an encoded ticket from the ticket dispenser, the encoded ticket having a code associated with the stored identity information and the balance of the account; and upon insertion of the encoded ticket by the releasee, operating the cash-release station for:

reading the code on the encoded ticket, via the ticket reader;

verifying that an identity input from the releasee to the identity reader matches the stored identity information associated with the releasee; and dispensing, from the cash storage via the cash dispenser, a cash amount equal to the balance of the account to the releasee.

2. The system of claim 1, wherein the operations processor is further configured to implement the cash-release management application for providing an invoice reflecting the cash-release transaction to the accounts-management and records system associated with the secure facility.

3. The system of claim 2, wherein the operations processor is further configured to implement the cash-release management application for submitting a request to one or both of a financial institution management system of a financial institution and a cash delivery system of an armored car service for replenishment of cash at the cash-release station.

4. The system of claim 1, wherein the verifying that the identity input matches the stored identity information comprises:

receiving, from the releasee, the identity input at the cash-release station;

comparing the identity input to the stored identity information; and confirming that the identity input matches the stored identity information.

5. The system of claim 4, wherein the identity information and the identity input each respectively comprise one or more of a thumbprint, a photograph, a wrist-band code, an inmate ID, an iris scan, and a voice print.

6. The system of claim 1, wherein the reading the code on the encoded ticket comprises extracting the stored identity information and the balance of the account from the code on the encoded ticket.

7. The system of claim 1, wherein the reading the code on the encoded ticket comprises using the code to query a remote database for the stored identity information and the balance of the account.

8. The system of claim 7, wherein the remote database comprises the accounts-management and records system associated with the secure facility.

9. The system of claim 1, wherein the encoded ticket comprises a printed ticket and the code comprises one of an RFID tag and a QR code.

10. The system of claim 1, wherein the encoded ticket comprises a magnetic card and the code comprises a magnetic strip.

11. The system of claim 1, further comprising an administrative terminal operating at the secure facility, wherein the administrative terminal is in communication with the secure communications network and configured to enable an administrator at the secure facility to interact with the cash-release management application.

12. A cash-release system for managing a cash-release transaction at a secure facility, comprising:

a network operations center in communication with a ticket printer exclusively operated by the secure facility and a separate cash-release station exclusively operated by the secure facility and a releasee from the secure facility, each of the ticket printer and the cash-release station operating within the secure facility, the cash-release station comprising:

a ticket reader in communication with an identity reader comprising one or more of a fingerprint scanner, a camera, a code reader, an iris scanner, and a voice recorder; and a cash storage in communication with a cash dispenser, and the network operations center comprising an operations processor executing a cash-release management module for:

receiving, from an accounts-management and records system associated with the secure facility, stored identity information and an account balance for the releasee;

generating, via the ticket printer and upon activation of a release function for the releasee by the secure facility, an encoded ticket having a code associated with the stored identity information and the account balance of the releasee;

receiving, via the ticket reader of the cash-release station, the encoded ticket from the releasee;

receiving, via the identity reader of the cash-release station, an identity input from the releasee;

reading, via the ticket reader of the cash-release station, the code of the encoded ticket;

verifying an identity of the releasee; and dispensing, from the cash storage via the cash dispenser of the cash-release station, the account balance to the releasee.

13. The cash-release system of claim 12, wherein the verifying the identity of the releasee comprises:

extracting the stored identity information of the releasee from the code of the encoded ticket or requesting, using the code of the encoded ticket, the stored identity information from the accounts-management and records system; and comparing the stored identity information to the identity input from the releasee.

14. The cash-release system of claim 13, wherein the operating processor further executes the cash-release management module for providing an invoice reflecting the cash-release transaction to one of the accounts-management and records system or a central records database within the network operations center.

15. The cash-release system of claim 14, wherein the operating processor further executes the cash-release management module for requesting, from one or both of a financial institution and an armored car service, a replenishment of cash in the cash storage of the cash-release station.

16. The cash-release system of claim 12, wherein the code reader comprises one or more of a bar-code reader and a QR-code reader.

17. The cash-release system of claim 12, wherein the encoded ticket comprises one of a printed ticket and a magnetic card and the code comprises one of an RFID tag, a QR code, and a magnetic strip.

18. A method of managing a cash-release transaction for a releasee from a secure facility using a cash-release system including a remote network operations center having one or more operating processors in communication with a secure facility, a financial institution, and a cash delivery service, the one or more of the operating processors executing a cash-release management module, the method comprising:

upon activation of a release function for the releasee by the secure facility, dispensing, via a ticket dispenser operating at and exclusively operated by the secure facility, an encoded ticket having a code associated with stored identity information for and an account balance of the releasee from the secure facility;

receiving, via an identity reader of a cash-release station operating at the secure facility and exclusively operated by the secure facility and the releasee, an identity input from the releasee, the identity reader comprising one or more of a fingerprint scanner, a camera, a code reader, an iris scanner, and a voice recorder;

reading, via a ticket reader of the cash-release station operating at the secure facility, the code on the encoded ticket;

obtaining, from the code on the encoded ticket or from an accounts management and records system associated with the secure facility, the stored identity information;

comparing the stored identity information to the identity input to verify an identity of the releasee;

obtaining, from the code on the encoded ticket or from an accounts management and records system associated with the secure facility, the account balance;

dispensing, from a cash dispenser of the cash-release station, the account balance to the releasee; and providing, to the accounts-management and records system, an invoice reflecting at least the identity of the releasee and the account balance dispensed to the releasee.

19. The method of claim 18, further comprising submitting, to a financial institution management system operated by the financial institution, an automated request for replenishment of cash at the cash-release station operating at the secure facility.

20. The method of claim 18, wherein the secure facility is one of a prison, a jail, a detention center, a mental-health institution, and a military complex.

* * * * *